UNITED STATES PATENT OFFICE
PTO – BOYERS, PA DUTY STATION

---

PAGE NOT AVAILABLE

PATENT NUMBER X7124 FOR THE ISSUE DATE 6 12211832 HAS BEEN SCANNED/LOADED, BUT WITH MISSING PAGE(S). UPON RECEIPT OF THE MISSING PAGE(S), THE ENTIRE DOCUMENT WILL BE RESCANNED. THIS NOTICE IS FOR THE MISSING PAGE CONTAINING:

Missing ALL Drawings

DATA CONVERSION OPERATION
BOYERS, PA

X7124 131
June 22, 1832

Henry Horn

Letters Patent.

The schedule referred to in these Letters Patent and making part of the same containing a description in the words of the said Henry Horn himself of his improvement in the fly Nets I having obtained letters patent according to law on the 12th day of September 1829 and another patent in an improvement on the aforementioned dated December the 8th 1831. The above Patents being for my invention of and improvement on the Fly Nets for carriage and saddle horses & mules &c. — But in the course of experience having found an additional improvement can be made which will be of superior advantage to the public I therefore desire to have the same additional improvement Patented according to Law, — — — This improvement consists of a crupper attached to the patent net by two small buckles or in any other manner as per sample sent herewith and to be deposited in the Patent office the same to be made of any kind of material either, woven twisted, plaited, or braided or to be made of leather, or in any other way, most suitable for convenience — The above invention to apply to Harness as well as saddle Nets, if thought proper and to secure all the advantages to me embraced in my former Patent rights above alluded to.

Henry Horn

Witnesses
Wm H. Horn
J. Badger

[illegible]

288 [illegible]